United States Patent
Potter et al.

(10) Patent No.: US 8,718,403 B2
(45) Date of Patent: May 6, 2014

(54) POSITIONAL MEASUREMENT OF A FEATURE WITHIN AN IMAGE

(75) Inventors: Kevin David Potter, North Somerset (GB); Christopher Setchell, Bristol (GB)

(73) Assignee: Imetrum Limited, Bristol (GB)

( * ) Notice: Subject to any disclaimer, the term of this patent is extended or adjusted under 35 U.S.C. 154(b) by 2266 days.

(21) Appl. No.: 10/532,438

(22) PCT Filed: Oct. 23, 2003

(86) PCT No.: PCT/GB03/04606
§ 371 (c)(1),
(2), (4) Date: Dec. 28, 2005

(87) PCT Pub. No.: WO2004/038328
PCT Pub. Date: May 6, 2004

(65) Prior Publication Data
US 2006/0115133 A1    Jun. 1, 2006

(30) Foreign Application Priority Data
Oct. 25, 2002    (GB) .................................. 0224923.3

(51) Int. Cl.
| | |
|---|---|
| G06K 9/00 | (2006.01) |
| G06K 9/36 | (2006.01) |
| G06K 9/64 | (2006.01) |
| G06K 9/68 | (2006.01) |
| H04N 5/253 | (2006.01) |
| H04N 7/18 | (2006.01) |
| G01B 11/14 | (2006.01) |
| G06F 15/00 | (2006.01) |
| G06K 1/00 | (2006.01) |
| H04N 1/04 | (2006.01) |

(52) U.S. Cl.
USPC ........... 382/291; 382/103; 382/141; 382/217; 348/94; 348/135; 356/614; 358/1.5; 358/488

(58) Field of Classification Search
None
See application file for complete search history.

(56) References Cited

U.S. PATENT DOCUMENTS

| | | | |
|---|---|---|---|
| 4,805,123 A | | 2/1989 | Specht et al. |
| 5,280,530 A | * | 1/1994 | Trew et al. .................. 382/103 |
| 5,640,200 A | | 6/1997 | Michael |

(Continued)

FOREIGN PATENT DOCUMENTS

| | | |
|---|---|---|
| EP | 0659021 A2 | 6/1995 |
| EP | 0999521 A2 | 5/2000 |
| WO | WO 0077720 | 12/2000 |

OTHER PUBLICATIONS

Foroosh et. al., "Extension of Phase Correlation to Subpixel Registration", IEEE Transactions on Image Processing, Mar. 2002, vol. 11 Issue 3.*

(Continued)

*Primary Examiner* — Kim Vu
*Assistant Examiner* — Nathan Bloom
(74) *Attorney, Agent, or Firm* — Gardere Wynne Sewell LLP (57) ABSTRACT

The position of a feature within an image is determined by determining an initial estimate of the feature position to within a fraction of a pixel, translating the feature by an amount equal to that fraction of a pixel, determining a further estimate of the translated feature position to within a fraction of a pixel and summing the pixel fraction of the previous estimate with the further estimate of the position to arrive at a refined estimate of the feature position.

20 Claims, 6 Drawing Sheets

(56) References Cited

U.S. PATENT DOCUMENTS

| | | | |
|---|---|---|---|
| 5,850,466 A | 12/1998 | Schott | |
| 6,208,769 B1* | 3/2001 | Pankratov | 382/300 |
| 6,356,300 B1* | 3/2002 | Shiba | 348/130 |
| 6,628,845 B1* | 9/2003 | Stone et al. | 382/294 |
| 6,961,481 B2* | 11/2005 | Lee et al. | 382/300 |
| 7,085,431 B2* | 8/2006 | Jones et al. | 382/278 |
| 2002/0044682 A1* | 4/2002 | Weil et al. | 382/154 |
| 2003/0228050 A1* | 12/2003 | Geshel et al. | 382/149 |
| 2003/0231791 A1* | 12/2003 | Torre-Bueno et al. | 382/133 |
| 2004/0146183 A1* | 7/2004 | Shimoni | 382/103 |
| 2004/0179738 A1* | 9/2004 | Dai et al. | 382/218 |

OTHER PUBLICATIONS

Qi Tian, Michael N. Huhns, Algorithms for subpixel registration, Computer Vision, Graphics, and Image Processingvol. 35, Issue 2, Aug. 1986, pp. 220-233, Elsevier 1986.*

Examination Report for EP 03769346.5 dated Oct. 7, 2009, 2 pp.

* cited by examiner

POSITIONAL MEASUREMENT OF A FEATURE WITHIN AN IMAGE

The present invention relates to a method of determining the position of a feature within an image, a method of measuring dimensional changes in an object utilising that method and apparatus for carrying out the methods, as well as a method and apparatus for monitoring an aircraft structure.

There is often a desire to monitor the strains or displacements in an object when that object is undergoing a mechanical test, or equally the displacements of large structures such as buildings or bridges under applied loads. Such monitoring can be used to determine the maximum mechanical loads that may be safely applied to a particular object, or to ensure that excessive displacements within an object that are likely to cause mechanical failure do not occur or are identified in time to apply corrective measures and thus prevent failure.

The measurement of strains in such mechanical tests is termed extensometry and has traditionally been carried out by mechanical or electromechanical instruments termed extensometers, or by the use of strain gauges. Other equipment such as dial gauges or linear variable differential transformers (LVDTs) are traditionally used for the measurement of displacements in such mechanical tests, whilst accelerometers are used in the monitoring of large structures. However, such mechanical or electromechanical instruments suffer from various disadvantages, including the requirements to place one or more parts of the equipment, or sensors, in direct contact with the object being monitored or tested. This is not practical for some fragile or small structures. Additionally, each extensometer or strain gauge can only monitor a discrete point of the object under test and it is therefore necessary to use a large number of extensometers or strain gauges if it is desired to monitor the whole of, or a large area of, the object under test. Furthermore, the use of such mechanical or electromechanical instruments in certain environments is not practical, for example in extremely hot and in particular extremely cold environments, or environments having chemically corrosive atmospheres.

Prior art systems are known that utilise captured video images for the measurement of distances between simple features such as lines or circles of a known geometry, the lines or circles often being physically attached to the object being monitored prior to the commencement of monitoring. The requirement to add such known geometrical features, or targets, to the object under test limits the minimum size of object that can be monitored using such prior art video monitoring systems.

An area in which it is beneficial to monitor the stresses and strains of a structure is the aerospace industry. Aircraft are designed to have a specific life under the various loadings that apply to them under operational conditions. Three separate lifetimes may be ascribed to an airframe; calendar age, flight cycles and flight hours, each relating to a different set of degradation mechanisms. Individual aircraft may then have very different mixes of the three measures of age. For instance, a commercial aircraft used on short haul routes will accumulate flight cycles far faster than an identical aircraft used on long haul routes, which may be accumulating flight hours at a much greater rate. Both limiting cases must be accounted for in the design process and maintenance schedules developed for the aircraft. These maintenance schedules account for a large proportion of the Direct Operating Costs (DOC) incurred by the operators in order to ensure the safety and integrity of the airframe. Despite these high maintenance costs there have been occasions where structural failure of the airframe has occurred leading to loss of life and great economic costs. The operators seek to reduce DOC and one way of doing this would be to carry out maintenance on the aircraft on an as-required basis rather than to a fixed schedule.

To achieve this without detriment to safety requires that the aircraft's systems be constantly monitored so that the condition of the aircraft is known at all times. Some major subsystems such as engines, avionics etc., can be so monitored. However, monitoring the airframe's response to flight loads and the condition of the aircraft's structure is more difficult. Efforts have been made to achieve this aim, and several approaches have been proposed. These rely on distributing sensors throughout the structures of interest, recovering data from these sensors and interpreting this data to give information relating to the local and global response of the airframe. Sensors that have been proposed include conventional strain gauges and their optical analogues, such as Bragg gauges, together with accelerometers and other sensors. Whilst these sensors are very effective at reporting local conditions they are less successful at monitoring the totality of the aircraft's structural response. Equally, to use these approaches requires a substantial investment in distributing an adequate array of sensors throughout the structure of the aircraft. This has negative cost implications for this approach and makes it primarily of applicability to future new-build aircraft.

According to a first aspect of the present invention there is provided a method of determining the position of a feature within an image, the image comprising a plurality of pixels, the method comprising determining an estimate of the position of the feature to within a fraction of a pixel, translating the feature such that the sum of the pixel fraction of the initial estimated position and the pixel translation is an integer value, determining a further estimate of the position of the translated feature within the image to within a fraction of a pixel and summing the pixel fraction of the previous estimate of the position with the further estimate of the position to derive a refined estimate of the feature position.

Preferably, the first and second determining steps comprise correlating the image feature and image using a predetermined correlation function to determine the position of the feature within the image to the nearest pixel, evaluating the correlation function at a plurality of pixel positions in the neighbourhood of the determined position and fitting the plurality of values to a further function and differentiating the further function to determine its turning point, whereby the position corresponding to the determined turning point provides the position of the feature to within the fraction of the pixel.

Additionally, the correlation function may be evaluated at a plurality of sub-pixel positions.

Additionally, the sub-pixel positions may be in closer proximity to the determined position than the pixel positions.

The method may further comprise determining the coordinates of the feature within a further image, the position of the further image being known relative to the first image; determining the difference in position of the feature between the first and further image; superimposing said first and further image such that said feature is substantially in registration, and applying a Super Resolution technique to said superimposed images, whereby an increased resolution representation of said feature is produced.

Additionally or alternatively, the predetermined correlation function may comprise a normalised greyscale correlation function.

Preferably, the translating step, second determining step and summing step are repeated at least once.

According to a second aspect of the present invention there is provided a method of measuring dimensional changes in an object, the method comprising capturing at least two images of the object, each image being captured at a different time with respect to one another, determining the position of the object within each image utilising the method of the first aspect of the present invention, and comparing the determined positions of the object to determine any dimensional changes.

According to a third aspect of the present invention there is provided positioning apparatus for determining the position of an object, the apparatus comprising an image capture device arranged to provide an image encompassing the object, the image comprising a plurality of pixels, and an image processor arranged to receive the captured image and determine the position of the object by executing the method steps according to the first aspect of the present invention.

Preferably, the positioning apparatus further comprises a monitor arranged to receive and display the captured image and object selection means arranged to select an object within the displayed image and identify the selected object to the image processor.

According to a fourth aspect of the present invention there is provided apparatus for detecting dimensional changes in an object, the apparatus comprising an image capture device arranged to sequentially provide a plurality of images encompassing an object, each image comprising a plurality of pixels, an image processor arranged to sequentially receive the plurality of captured images and determined the position of the object from each image by executing the method steps according to the first aspect of the present invention, and a position comparator arranged to compare the determined position of the object for each image and determine if the determined position changes between images.

According to a fifth aspect of the present invention there is provided a method of determining the 3-dimensional coordinates of a feature, the method comprising: providing at least two image capture devices each arranged to capture an image including the feature; determining the position of each of said image capture devices with respect to one another; determining the coordinates of the feature within each image in accordance with the method of the first aspect of the present invention, and calculating the 3-dimensional coordinates of the feature given the determined feature coordinates in each image and the determined relative positions of each image capture device.

According to a sixth aspect of the present invention there is provided a method of measuring 3-dimensional changes in an object, the method comprising: providing at least two image capture devices at a known spatial relationship to one another; capturing at least two images of the object with each image capture device, the two images being captured at a different time from one another; determining the 2-dimensional position of the object within each image in accordance with the method of the first aspect of the present invention; calculating the 3-dimensional position of the object from the first and second images from the 2-dimensional position and spatial relationship of the image capture devices; and comparing the 3-dimensional positions to determine any dimensional changes.

According to a seventh aspect of the present invention there is also provided a method of determining the coordinates of a feature within an image to within a fraction of a pixel, the image comprising a plurality of pixels, the method comprising: correlating the image feature and image using a predetermined correlation function to determine the coordinates of the feature within the image to the nearest pixel; evaluating the correlation function at a plurality of sub-pixel positions in the neighbourhood of the determined coordinates and fitting the plurality of values to a further function; and differentiating the further function to determine its turning point, whereby the coordinates corresponding to the turning point provide the coordinates of the feature to within said fraction of a pixel.

By evaluating the correlation function at sub-pixel positions, that is positions having co-ordinates comprising fractions of a pixel (for example (15⅓, 32⅔)), the function to which the values are fit are likely to be a closer fit and so produce a more accurate initial estimate of the feature position.

According to a further aspect of the present invention there is also provided a method of monitoring an aircraft structure, the method comprising the steps of attaching one or more image capture devices to a first portion of an aircraft structure, attaching one or more targets to a second portion of the aircraft structure, the or each target being within the field of view of the or each image capture device, capturing a series of images from the or each image capture device and processing the captured images to determine the magnitude and/or direction of movement of the or each target.

Metrology techniques based on the acquisition and manipulation of video data streams are thus used to monitor the relative displacements of different parts of an aircraft structure to a high degree of accuracy. From the data on the displacements, the deformation of the aircraft structures can be deduced and the major loadings on the airframe can be monitored. These loadings can then be summed over time, for example, to indicate the rate at which the fatigue life of the airframe is being used. Additionally, comparison of the deformation in different structures can provide information on the structural condition of the aircraft. For example, monitoring wing and fuselage deformations provides information on the fuselage's response to the wing loadings. Changes in this response over the life of the aircraft can be coupled to structural response and 'wear-out' models to provide indication of out of specification conditions requiring investigation or the residual fatigue life available to the airframe. Lastly, for a fly by wire aircraft, the information on the relative displacements of different parts of the aircraft's structure can be coupled into the aircraft's flight control system so as to provide feedback control to minimise aircraft manoeuvre loads.

Preferably, the method comprises attaching at least three targets to the second portion of the aircraft structure at known relative positions to the second portion of the aircraft, the at least three targets being within the field of view of the or each image capture device, whereby the position and orientation of said second portion of the aircraft relative to the or each image capture device is determined by said processing step.

Additionally, at least one further target may be provided mounted orthogonally offset from the plane of the other targets within the same field of view of an image capture device. This has the advantage of magnifying the movement of the further target due to bending of the aircraft structure to which it is attached.

Alternatively, a reflective surface, such as a mirror, may be attached to the aircraft structure such that at least one of the targets is within the field of view of an image capture device when viewed through the mirror.

Each image capture device may be arranged to automatically identify the targets as items of interest. This allows a target to be automatically reacquired should it be momentarily obscured from the view of the image capture device.

According to another aspect of the present invention there is provided an aircraft structure monitoring apparatus comprising: at least one image capture device arranged to be attached to a first portion of an aircraft structure; at least one target arranged to be attached to a second portion of the aircraft structure, whereby the at least one target is within the field of view of the at least one image capture device; and an image processor arranged to receive a plurality of images from the at least one image capture device and process said received images to determine the magnitude and/or direction of movement of the at least one target.

Additionally, the target may be in the form of an illuminated panel that includes areas of differential illumination. The illumination may be provided by LED's or other similarly reliable light sources. Such targets minimise the influence of ambient light levels on the accuracy of the monitoring apparatus.

Additionally or alternatively, a flexible light guide may interconnect the image capture device and target. The light guide may be a sealed, flexible tube or other suitable means provided to act as a shroud to prevent people and/or other objects from obscuring the targets from the camera and to reduce or eliminate the effects of changes in ambient lighting.

Additionally, the image processor may execute any one of the methods of the aspects of the present invention described hereinabove, although other positional determining techniques may alternatively be applied.

Embodiments of the present invention are described below, by way of illustrative example only, with reference to the accompanying figures, of which.

FIGS. 1a to 1e schematically illustrate a prior art method of determining the (X,Y) position of a feature within an image. In practice, a video image of the required scene is captured using a conventional CCD (charge coupled device) camera and converted to a data stream that a computer can manipulate via a frame grabber. On an image on a connected computer monitor, bounding regions are drawn around those features of the image that the user wishes to monitor the position of. Suitable software captures the pattern associated with those features and outputs an (X,Y) position corresponding to the position of each feature. The illustrated prior art method for the identification of the position of features in a video stream of no fixed geometry is known as template matching. Template matching is performed by using a correlation function to measure the degree of the similarity between two images, or parts of images. Standard correlation functions used include Normalised Greyscale Correlation (NGC), Greyscale correlation and Euclidean distance. Those skilled in the art will readily appreciate the inherent advantages and disadvantages of each of these functions. Generally speaking however, NGC provides the most desirable results and is often the correlation function of choice, such that the term Normalised Greyscale Correlation is often used to describe template matching using NGC.

The correlation function is used to find the region of an image that best matches the feature captured by the bounding region. The correlation function returns a score of how well the feature captured by the bounding region matches the underlying image when the feature captured by the bounding region is at a position (X, Y) in the image. The correlation function is evaluated at a number of (X, Y) positions in the image to determine the position that gives the best value of the correlation function. This yields the (X, Y) position of the feature within the image to the nearest pixel.

Figure 1A:
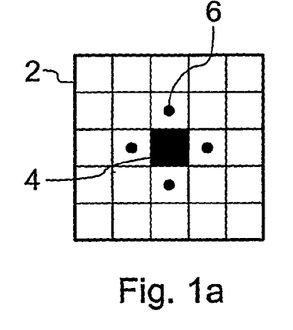
FIGS. 1a to 1c illustrate the choice of neighbouring pixels to the position of the best matched pixel for 4, 8 and 24 neighbouring pixels respectively.
Figure 1B:
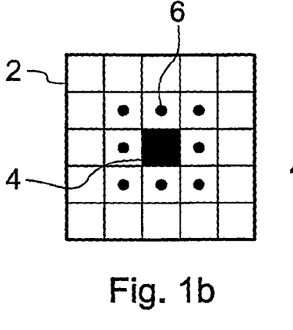
Figure 1C:
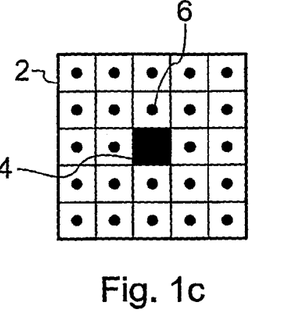

Having located the position of the feature to the nearest pixel, its sub-pixel position can be estimated. The correlation function is evaluated at N surrounding positions. FIGS. 1a to 1c schematically represent a pixel with 4, 8 and 24 nearest neighbours respectively. In each of FIGS. 1a to 1c each small square 2 represents an individual pixel, with the central, shaded square 4 representing the position of the feature of interest, to the nearest pixel. The neighbouring pixels at which the correlation function is evaluated, are indicated by the squares having black dots in them 6. The values of the correlation function at the N surrounding pixels are fitted to a function, such as a bi-quadratic, typically using a least-squares fitting technique. The sub-pixel position of the feature may then be estimated by differentiating the quadratic and calculating the position of its turning point since the maximum fit will occur at a turning point in the differentiated quadratic. The number N of surrounding pixels is chosen to ensure that N is at least equal or greater than the number of free parameters in the selected function, so that the function can be solved.

Figure 2A:
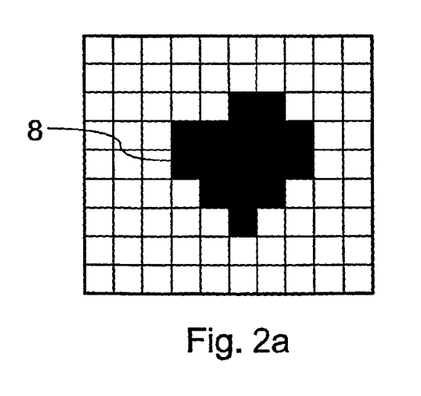
FIGS. 2a and 2b illustrate the effects of aliasing between a reference image and comparison image.
Figure 2B:
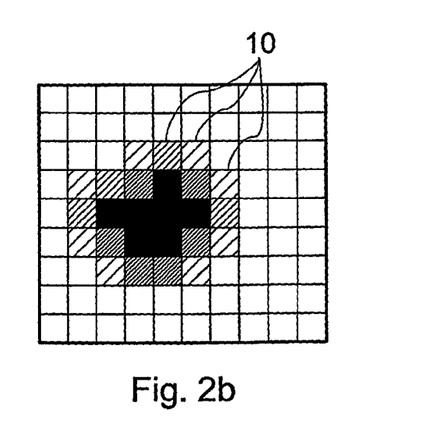

A typical accuracy for a good implementation of template matching using normalised greyscale correlation is in the region of 0.01 pixels, under ideal conditions. However, for certain applications such as those proposed in the monitoring of mechanical testing, or the movements of large structures, this accuracy is inadequate. Furthermore, the NGC approach has an additional technical limitation as is explained with reference to FIGS. 2a and 2b. In each of FIGS. 2a and 2b, each individual square represents a single pixel, with the reference feature of an image represented by the filled boxes 8. As is well known, each pixel may have a specific greyscale value anywhere between, and including, black and white. In the example shown in FIG. 2a, the feature is composed initially of a series of pixels of the same greyscale, either black or white. If the next captured, or comparison, frame of the video image represents a shift of exactly an integer number of pixels, then the pattern of the comparison and reference images will be an exact match. However, if the comparison image has moved a non-integer number of pixels then the pattern will be as seen in FIG. 2b. The pattern is now bounded by pixels 10 in which the greyscale value is between black and white as represented by the cross-hatching, and the pattern is clearly visually distinct from that of the reference feature. This effect is known as aliasing.

Figure 3:
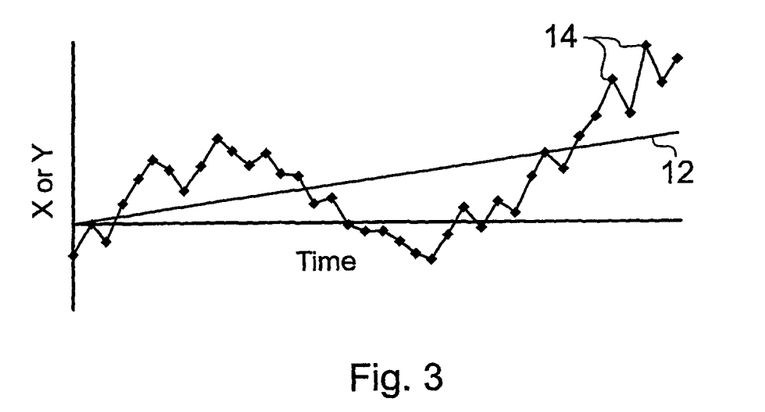
FIG. 3 schematically illustrates the positional errors typical of normalised correlation.

This difference in pattern due to the movement across pixel boundaries of the reference feature of interest does not disrupt the ability of the NGC approach described above to monitor the (X, Y) position to a level of accuracy in the region of 0.01 pixels. However, if the reference feature of interest is displaced by a known amount for each frame over a series of frames, the level and type of error between the actual and estimated (X, Y) position can be found. When this procedure is carried out it is seen that the normalised correlation approach generates both random and structured, or systematic, errors due to the aliasing effects. This is represented schematically in FIG. 3. The straightline 12 represents the true X or Y position of the reference feature of interest, whereas the markers 14 show the data points that might be calculated using the NGC approach. It can be seen that the discrepancy between actual and estimated positions have a random error, represented by the deviations of each data point from the general curve defined by them, and a systematic error represented by the deviation of the general curve from the straight line 12, this being typical of the results of the NGC approach.

Embodiments of the present invention utilise the NGC approach to gain an initial estimate of the position of the reference feature of interest. However, two additional operations are performed to both eliminate the systematic error and refine the best estimate of the position of the reference feature of interest to give the maximum resolution.

Figure 4:
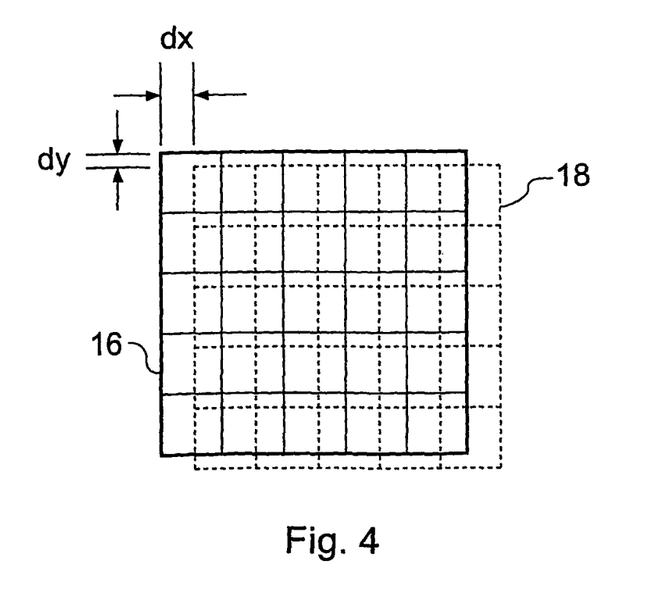
FIG. 4 schematically illustrates the projection of a pixel array onto a fractionally shifted pixel array in accordance with an embodiment of the present invention.

In embodiments of the present invention, the standard NGC technique is used to calculate an initial estimate of the sub-pixel position of the feature. The feature is then resampled by projecting the pixel array onto a new pixel array that has been shifted by a fractional part of a pixel, such that the sum of the pixel translation and the fractional part of the estimated sub-pixel position is an integer value. That is to say if the position estimate is ($x$½, y¼) the pixel array may be shifted by −½ a pixel in the X direction and −¼ a pixel in the Y direction. Alternatively, the pixel array may be shifted by +½ a pixel in the X direction and +¼ a pixel in the Y direction. Usually the choice of direction of translation would be such so as to minimise the magnitude of the translation. It will also be appreciated that the entire image may alternatively be translated. This is illustrated in FIG. 4. The solid grid 16 represents the initial pixel array, whilst the broken grid 18 represents the new pixel array that has been shifted by the fractional part of the current sub-pixel position estimate. The fractional part of the sub-pixel position estimate (e.g. half a pixel) is represented by DX, DY as shown in FIG. 4. The resampled pixels will now look more like the reference feature as the resampling process approximately models the aliasing effects illustrated in FIG. 2. That is to say, by shifting each pixel by a fractional part of a pixel, each pixel has either a greyscale value closer to black or white or where the greyscale value was already black or white it remains so. The correlation function is then re-evaluated at the best matched position and its N surrounding neighbours and the sub-pixel position recalculated, using the standard NGC technique. The fractional part (DX, DY) of the original sub-pixel position estimate is added to the re-evaluated best matched position to give a refined sub-pixel estimate. This procedure may be iterated a number of times to further refine the sub-pixel estimate.

Figure 5A:
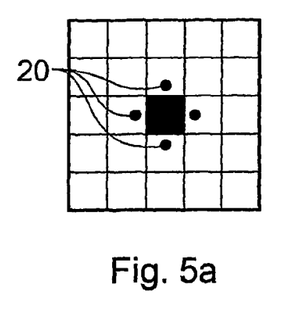
FIGS. 5a to 5c schematically illustrates the sub-pixel positions of neighbouring sub-pixel points about the position of a best matched pixel.
Figure 5B:
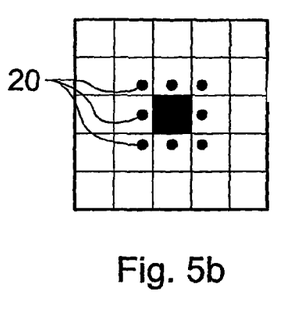
Figure 5C:
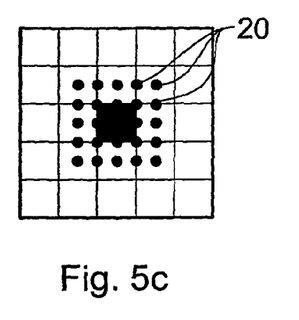

A further improvement in accuracy is achieved by taking the N neighbouring samples of the correlation function at sub-pixel positions. Using pixel interpolation, recalculated pixel values may be derived and the correlation function may be evaluated at any real valued co-ordinate. This is schematically illustrated in FIGS. 5a to 5c in which the 4, 8 and 24 respective neighbouring sampled points 20 are at sub-pixel positions. The bi-quadratic to which the values of the correlation function evaluated at the N surrounding positions is fitted may better approximate the true correlation surface near its peak value if the N neighbours are chosen to be close to the peak. This leads to an improvement in accuracy if the N neighbours are chosen to be close to the position of the best matched pixel.

Additionally or alternatively, to further refine the best estimate of the position of the reference feature of interest, use is made of a known Super Resolution techniques. As will be known to the skilled man, these techniques create a single, high resolution image from two or more similar images. The plurality of images are aligned in complete registration to sub-pixel accuracy. The information present in the aligned images is then combined using any known Super Resolution technique, to produce a single, high resolution image, (i.e. more pixels than any of the originals).

Super Resolution is applied here to generate a high resolution representation of the feature. Multiple images containing the feature are available and using the techniques described above the position of the feature is known within each image to sub-pixel accuracy. The images can therefore be aligned such that the feature appears in complete registration throughout the image set. A high resolution version of the feature can then be calculated.

Use of the high resolution feature can be made in the technique described in relation to FIGS. 5a to 5c, where more accurate pixel interpolation can be accomplished. Hence the evaluation of the correlation function at the N sub-pixel nearest neighbour sample points 20 can be more accurate still. The high resolution representation of the feature also enables the feature translation used in refining the initial estimate of the position of a feature to be accomplished to a higher accuracy.

Mechanical testing or structural monitoring applications are well suited to employing Super Resolution techniques as generally the monitored image is changing slowly. Therefore, each frame is only marginally different from subsequent frames. The use of this technique allows the use of simple low pixel count cameras to approach the results that would be possible with much more costly high pixel count cameras.

The process of sequentially applying these refinement techniques to the raw data available from the known NGC algorithms improves resolution by a factor of about 5 and removes the systematic errors. These features enable the use of a video camera to monitor the strains or deflections in mechanical tests of materials or structures to the same level of accuracy as is possible with conventional methods of measurement such as extensometers, strain gauges or LVDTs.

Figure 6:
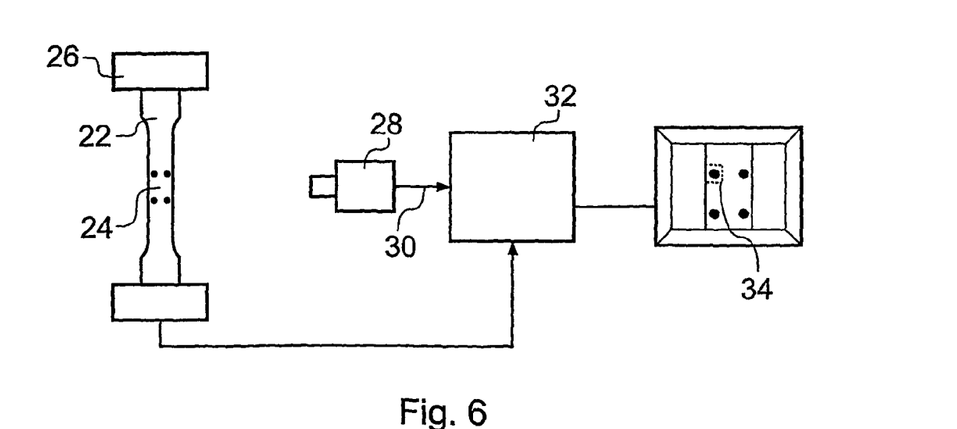
FIG. 6 schematically illustrates video metrology apparatus according to an embodiment of the present invention.

FIG. 6 schematically shows video metrology equipment constituting an embodiment of the present invention. A test sample 22 having a visual target 24 marked thereon, is placed in a test machine 26. The test machine is arranged to apply a slowly increasing tensile load to the test sample 22. A video camera 28 is arranged to monitor the test sample 22 at the target location 24 and provides video data 30 to a processor 32. The processor also receives sample load data from the test machine. The processor is arranged to implement the method of the present invention as described hereinabove. A monitor 34 is coupled to the processor 32 and is arranged to show the captured video image, or results of the image processing performed by the processor.

The processor 32 includes a comparator for comparing the determined position of an object or feature from a sequence images received from the video camera 28. The compared positions allow any dimensional changes, such as stretching or deflection, of the test sample 22 to be identified and measured very accurately. The sequence of images received from the video camera 28 may be each video frame, or may be more widely separated in time as is appropriate.

A feature selector (not shown) may also be included within the equipment to allow manual or automatic selection of an object or feature within an image to be made. The feature selector may, for example, comprise circuitry arranged to generate a bounding region superimposed on the image displayed on the monitor 34, the position of the bounding box being controllable by a user, or may utilise image recognition technology to select a feature. An object or feature of interest is thus enclosed by the bounding box and identified to the image processor 32 as the object the position of which is to be determined.

The video capture and analysis apparatus may equally be used as a simple positioning system, the position of an object being determinable to a high level of accuracy. This has applications in precise 'pick and place' operations, such as within integrated circuit manufacture.

This invention offers a substantial improvement in resolution compared to the video metrology approaches of the prior art and gives results that are equivalent to those obtained by conventional extensometers or strain gauges. Furthermore, the invention is not limited to specific high contrasts target geometries and can utilise the natural markings on samples, thus avoiding problems with applying targets. This freedom of target geometry and contrast allows very small samples to be tested, permitting full advantage to be taken of the scale insensitivity inherent in video metrology.

Whilst the basic application of embodiments of the present invention discussed herein is the precision measurement of dimensional changes and test samples undergoing mechanical tests (extensometry), additional applications exist. For example, the monitoring of civil engineering structures such as bridges and buildings, precision placement of articles such as microchips in a production setting, the measurement of human gait, and other similar applications. Additionally, using two or more cameras so as to be able to obtain precision movement data in three dimensions further extends a range of potential fields of application.

Figure 7:
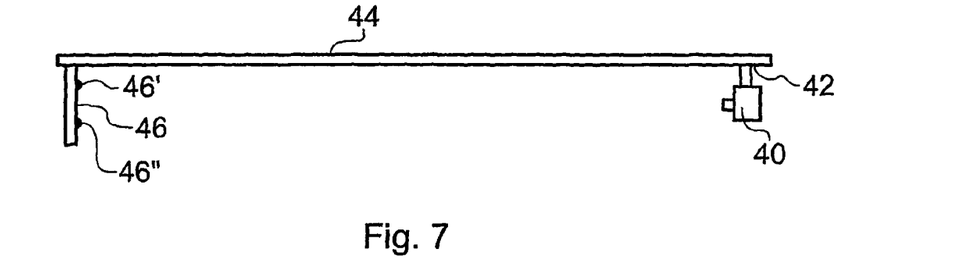
FIG. 7 schematically illustrates an aircraft structure monitoring apparatus according to an embodiment of the present invention.

An application of video metrology is in the monitoring of deformations in the main fuselage, or other structural elements, of an aircraft. An example of a suitable arrangement of apparatus is shown in FIG. 7. A camera 40 or cameras is rigidly attached to a fixed point 42 or points on the aircraft structure 44 and trained along the fuselage to image a set of targets 46 some distance away, also rigidly attached to the aircraft structure.

The camera 40 and targets 46 could be within the aircraft cabin(s) or cargo hold(s), or be mounted externally. In one embodiment two targets 46', 46" are to be used. The image of the two targets are provided by the camera 40 to a suitable computer and are captured by appropriate software and their position in subsequent frames tracked using algorithms such as, but not exclusively, grey scale normalised correlation. The particularly suitable robust and high accuracy video gauging approach described herein may be used but any suitable position tracking technique could also be utilised. The position of the targets in pixels is constantly determined by the computer and converted into real dimensions.

Figure 8A:
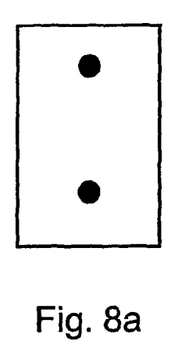
FIGS. 8a-8e illustrate possible deflection of image targets according to an embodiment of the present invention.
Figure 8B:
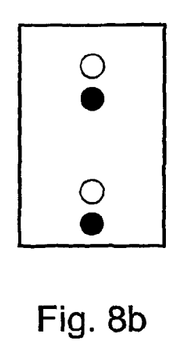
Figure 8C:
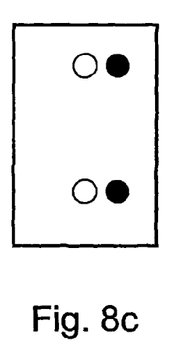
Figure 8D:
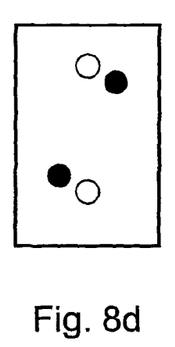
Figure 8E:
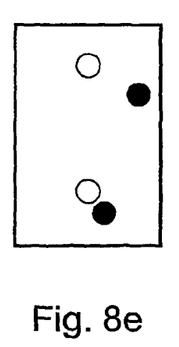

The use of two targets permits vertical and horizontal deflections to be measured and any twisting of the fuselage to be identified, corresponding to pitch, yaw and roll deformations. This is illustrated in FIGS. 8a to 8e. Each possible deflection of the imaged targets is shown separately in FIGS. 8a to 8d and combined in FIG. 8e. FIGS. 8b and 8c respectively show the target deflections that would be caused by vertical and horizontal shear or bending of the fuselage. FIG. 8d shows the target deflection caused by torsion, or twisting, of the fuselage.

Figures 9A, 9B, 10:
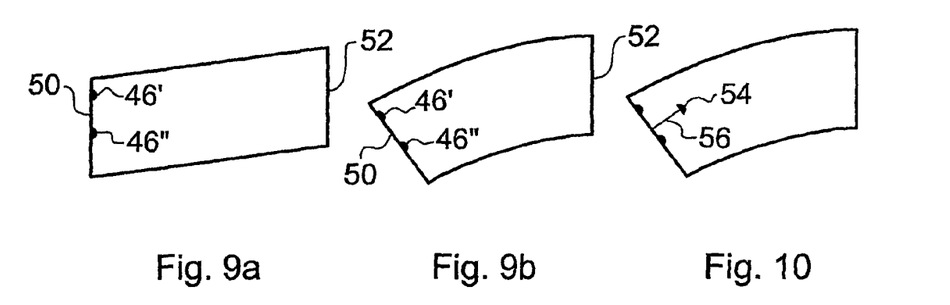
FIGS. 9a and 9b schematically illustrate respectively the effect of pure shear and pure bending on a structure.
FIG. 10 schematically illustrates the addition of an offset target according to an embodiment of the present invention.

FIGS. 9a and 9b show the difference between shear and bending and illustrates how these two deformation modes can be separated. FIG. 9a shows pure shear. In this case the vertical lines 50 and 52 remain parallel and the apparent distance between the two targets 46' and 46" remains unchanged. FIG. 9b shows pure bending. In this case the vertical lines 50, 52 are no longer parallel, so the distance between the two targets changes. However, for small bending deflections the change in distance is difficult to readily detect. The addition of another target(s) 54, offset from the plane of the first target(s) 46', 46", as shown in FIG. 10 overcomes this difficulty by providing an adequate lever arm 56 to multiply the deformation into the readily measurable range.

Figure 11:
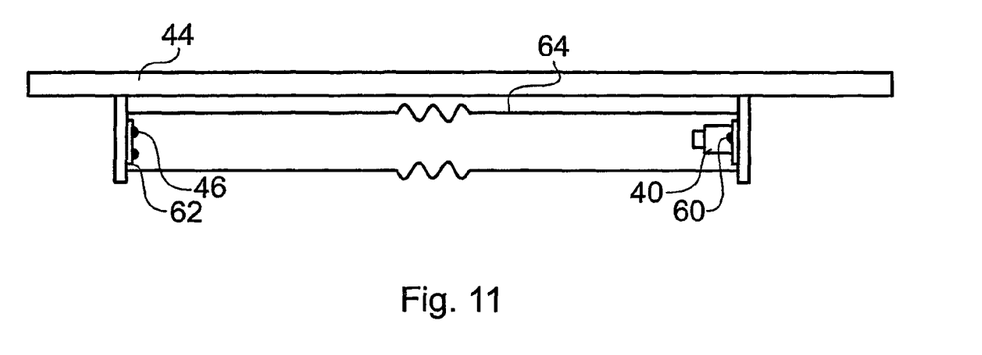
FIG. 11 schematically illustrates a further arrangement of the aircraft monitoring apparatus of FIG. 7.

An alternative way of separating out shear and bending deformations is to mount an additional target 60 at a known relative position to the camera 40 but view it in a mirror 62 mounted in the same plane as the target 46 as shown in FIG. 11. The image of the additional target 60 in the mirror would only appear to move with a bending deformation and would be completely insensitive to pure shear or torsional deformations.

The monitoring software may include automatic target detection functions to reacquire targets lost, for example, by momentary obscuration by passengers or flight crew. A greater number of targets than two would be of benefit in terms of providing redundant data channels, and of limiting obscuration issues. In an embodiment two cameras may be placed back to back in fixed register with each other at the mid point of the fuselage, or cabin, with targets at each end of the fuselage, or cabin, to provide an unambiguous picture of the totality of the deflections in the cabin. A particularly suitable form of target and target carrier is an illuminated panel upon which the targets are marked as areas of differential illumination. LEDs or similar high reliability light sources can be utilised. Such targets would minimise any influence of the level of cabin illumination on the accuracy of the monitoring function. However other suitable targets may also be used. For multicabin aircraft each cabin may be monitored individually or the optimum cabin for monitoring may be identified by an examination of the overall structural response of the airframe. Equally, the cameras and targets may be mounted externally to the fuselage to provide similar data on wing, rudder or tail deflections.

An alternative approach is to use a sealed monitoring unit, as also shown in FIG. 11. This incorporates the camera(s), targets, light source(s) and mirrors into a sealed but flexible tube 64, which can be mounted, for example, between fuselage frames in the cargo bay or between ribs in the wing. The tube acts as a shroud to prevent people and/or objects from obscuring the targets from the camera and block out the effects of changes in ambient lighting.

The monitoring function takes place in the image space so that the overall dimensional resolution of this system can be adjusted as required by the use of suitable lenses on the cameras. The high accuracy video gauging approach described herein is capable of a proven resolution better than 0.005 pixels for a single target and a conventional, low cost camera will have an image field of more than 500 pixels, giving a resolution of 1 part in 100,000.

From these figures an example of the potential sensitivity of the measurement of structural response can be calculated. If the image field in which the targets are situated has a physical size of 100 mm square the deflections of targets that can be detected are of the order of 1 μm. If the initial distance between two targets is 50 mm within that image field then the angular deformation in the torsional sense that can be detected between those targets is of the order of 0.002°. For a change in angle from the vertical plane of 0.1°, due to bending, the apparent change in distance between two targets 50 mm apart is less than 0.1 µm, which is not resolvable. However, if a second target set is mounted as shown in FIG. 10 (i.e. rigidly normal to the mounting point of the first set with a dimensional offset between them) with an offset of 50 mm, then the apparent movement of that target is more than 80 µm, which is readily resolvable. The change in angle from the vertical plane is assessed via the relationship between the two offset target sets and an angular resolution of the order of 0.002° is achievable. Changes in the offset distance may be used to regulate this resolution. It should be noted that the offset need not be achieved with physical structure, a small LED laser could be used to shine on a translucent screen, with that laser spot being taken as the target. In this case the offset could be as great as required without any difficulties due to the response of the structure utilised to generate the dimensional offset.

By viewing a target with two or more cameras the position of the target can be measured in 3D. A single camera is sufficient to measure the 3D position and orientation of an object that has 3 or more targets attached.

For any particular airframe the maximum structural deflections would be found by interrogating the design and structural analyses and appropriately sized targets, image fields and lens systems determined. Wing deflections are substantially greater than fuselage deflections. However, this would not influence the basic approach, merely requiring the use of a different lens system to provide an appropriately scaled target image field and targets. The data acquired by the gauging system can be interrogated by an appropriate computer system and events that exceeded a predetermined level or levels logged. In this way the loadings on the specific airframe can be monitored and summed for comparison with models of the design fatigue life of the airframe and structurally safe maintenance or inspection intervals determined. Additionally, any very severe events that fall outside the design envelope can be instantly detected to trigger remedial actions.

The invention claimed is:

1. A method for determining coordinates of a feature comprising:
    providing a first image including the feature, the first image comprising a plurality of pixels;
    determining a first estimate of coordinates of the feature to within a fraction of a pixel;
    translating the feature relative to the pixels by a pixel translation value, wherein the sum of the pixel fraction and pixel translation value is an integer value;
    determining a second estimate of coordinates of the translated feature to within a fraction of a pixel; and
    summing the pixel fractions of the first estimate with the second estimate to derive a refined estimate of coordinates.

2. The method according to claim 1, wherein each of the first and second determining steps comprise:
    correlating the feature and the image using a predetermined correlation function to determine coordinates of the feature to the nearest pixel;
    evaluating the correlation function at a plurality of pixel positions in the neighborhood of the determined coordinates to provide a plurality of values;
    fitting the plurality of values to a further function; and
    differentiating the further function to determine its turning point, whereby coordinates corresponding to the turning point provide coordinates of the feature.

3. The method according to claim 2, wherein the correlation function is evaluated at a plurality of sub-pixel positions.

4. The method according to claim 3, wherein the sub-pixel positions are closer in proximity to the determined coordinates than the pixel positions.

5. The method according to claim 2, wherein the predetermined correlation function is a normalized greyscale correlation function.

6. The method according to claim 1, wherein the translating step, second determining step and summing step are repeated at least once.

7. An apparatus for determining a position of an object comprising:
    an image capture device arranged to provide a captured image encompassing the object, the captured image comprising a plurality of pixels; and
    an image processor arranged to receive the captured image and determine the position of the object by executing the method of claim 1.

8. The apparatus according to claim 7 further comprising:
    a monitor arranged to receive and display the captured image; and
    an object selection means arranged to select a further object within the displayed image and to identify the further object to the image processor.

9. An apparatus for determining a position of an object comprising:
    an image capture device arranged to sequentially provide a plurality of captured images of an object, each captured image having a plurality of pixels;
    an image processor arranged to sequentially receive the plurality of captured images and determine the position of the object from the plurality of captured images by executing the method of claim 1; and
    a position comparator arranged to compare the determined position of the object for the plurality of captured images and identify whether the determined position changes in the plurality of captured images.

10. The apparatus according to claim 9 further arranged to determine the change in the determined position, the change selected from the group consisting of magnitude, direction, and combinations thereof.

11. A method for determining coordinates of an object, the method comprising the steps of:
    capturing at least one first image and at least one second image of the object, each image being captured having different coordinates with respect to the other;
    determining the position of the object within each image, wherein determining includes;
        providing the first image including a feature, the first image comprising a plurality of pixels;
        determining a first estimate of coordinates of the feature to within a fraction of a pixel;
        translating the feature relative to the pixels by a pixel translation value, wherein the sum of the pixel fraction and pixel translation value is an integer value;
        determining a second estimate of coordinates of the translated feature to within a fraction of a pixel;
    summing the pixel fractions of the first estimate with the second estimate to derive a refined estimate of coordinates; and
    comparing the determined positions of the object to determine dimensional changes.

12. The method of claim 1, wherein the refined estimate of coordinates is recorded on a computer readable medium.

13. The method of claim 11, further comprising determining a 2-dimensional position of the feature within the at least first image and the at least second image, wherein a position of the at least second image is known relative to the at least first image.

14. The method of claim 13, further comprising calculating a 3-dimensional position of the feature from the 2-dimensional position for the at least two images.

15. The method of claim 1, further comprising determining coordinates of the feature within a second image, the position of the second image being known relative to the first image.

16. The method of claim 1, further comprising determining a difference in position of the feature between the first image and at least one second image, wherein the at least one second image includes coordinates and has a position known relative to the first image.

17. The method of claim 1, further comprising superimposing the first image and a second image to provide a superimposed image, wherein the position of the second image is known relative to the first image, and wherein the feature is substantially in registration.

18. The method of claim 1, wherein the method is applied for monitoring an aircraft structure.

19. The method of claim 1, wherein the first image is captured with an image capture device.

20. The method of claim 11, wherein the coordinates are recorded on a computer readable medium.

* * * * *

UNITED STATES PATENT AND TRADEMARK OFFICE
CERTIFICATE OF CORRECTION

| | | |
|---|---|---|
| PATENT NO. | : 8,718,403 B2 | Page 1 of 1 |
| APPLICATION NO. | : 10/532438 | |
| DATED | : May 6, 2014 | |
| INVENTOR(S) | : Kevin David Potter et al. | |

It is certified that error appears in the above-identified patent and that said Letters Patent is hereby corrected as shown below:

In the Specification:

At column 5, line number 54, replace [FIGS. 1*a* to 1*e*] with -- FIGS. 1*a* to 1*c* --

At column 7, line number 35, replace the phrase [+1/4 a pixel in the Y direction] with the phrase -- +3/4 a pixel in the Y direction --

Signed and Sealed this
Eighth Day of July, 2014

Michelle K. Lee
*Deputy Director of the United States Patent and Trademark Office*